Figures 1, 2:
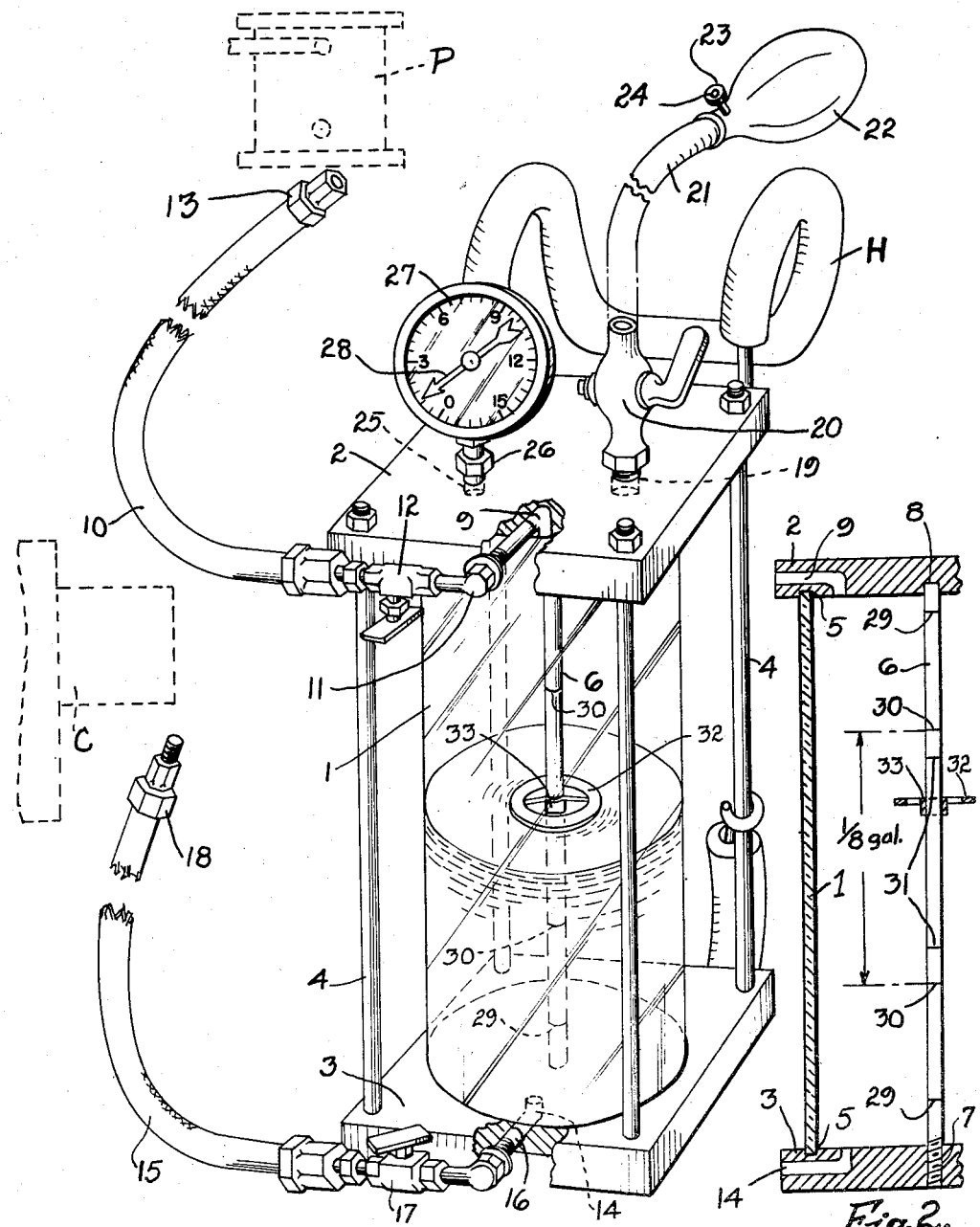

Sept. 22, 1953    D. BRACCI    2,652,719
APPARATUS FOR TESTING THE FUEL
CONSUMPTION OF MOTOR VEHICLES
Filed Sept. 23, 1950

INVENTOR
DANTE BRACCI
BY Owen W. Kennedy
ATTORNEY

Patented Sept. 22, 1953

2,652,719

UNITED STATES PATENT OFFICE 2,652,719

APPARATUS FOR TESTING THE FUEL CONSUMPTION OF MOTOR VEHICLES

Dante Bracci, Franklin, Mass.

Application September 23, 1950, Serial No. 186,340

1 Claim. (Cl. 73—113)

The present invention relates to apparatus for testing the fuel consumption of the internal combustion engine of a motor vehicle, and has for its object to provide a device that will accurately determine the actual mileage obtained by the vehicle, under road conditions, from the consumption of a predetermined amount of fuel.

According to the present invention, there is provided a simple and effective testing apparatus of the above indicated character which, when mounted on the door of a vehicle, can be conveniently connected to the fuel pump and carburetor of the engine in preparation for a road test. When so mounted and connected, the device is in a position for ready observation by the driver, or mechanic accompanying the driver, of the vehicle, so that the amount of fuel which is to be used for any given road test, can be quickly and accurately determined, and the test conducted with this amount, or any other desired amount of fuel, as determined by a calibrated metering element forming part of the device.

The above and other advantageous features of the present invention will hereinafter more fully appear from the following description, considered in connection with the accompanying drawings, in which, Fig. 1 is a perspective view of a testing apparatus embodying the invention, in association with the fuel pump and carburetor of an internal combustion engine.

Fig. 2 is a vertical sectional view of a portion of the apparatus shown in Fig. 1.

As best shown in Fig. 1, the apparatus comprises an assembly of parts adapted for mounting as a unit, in a generally vertical posiiton, by means of a handle H that can be conveniently hung over the edge of the door window of a motor vehicle, adjacent to the driver's seat, preferably the front passenger side. The unit consists of a fuel measuring cylinder I composed of transparent material, such as heavy duty glass which is capable of withstanding a considerable pressure. This cylinder is closed at its ends by being clamped between metal plates 2 and 3 that are held together by suitable bolts 4, with the ends of a cylinder I tightly received in grooves 5 provided by the plates, so that the cylinder provides a liquid tight receptacle.

A metering rod 6 extends centrally of the cylinder I, with the rod being screwed into an opening 7 in the lower plate 3, as shown in Fig. 2, so that when the plates 2 and 3 are assembled on the bolts 4, the upper end of the rod 6 will be tightly held in an opening 8 provided in the upper plate 2. Therefore, the rod 6 always extends along the central axis of the cylinder I, and can be employed to serve as an indicator of the amount of fuel contained within the cylinder I, in a manner which will be later described.

The upper plate 2 is provided with an inlet passage 9 extending from the outside of the plate to a point inside the cylinder I, and a flexible conduit 10 is connected to the passage 9 by means of a suitable fitting II, with a valve 12 located between the conduit 10, and the passage 9. The free end of the conduit provides a fitting 13 by means of which it may be connected to the outlet of a fuel pump forming part of the fuel feeding system of an internal combustion engine of a motor vehicle. This fuel pump is indicated in dotted lines by the reference character P in Fig. 1, and since it is of standard construction, a detailed description thereof is unnecessary for the purpose of the present application.

The lower plate 3 provides an outlet passage 14 extending from the outside of the plate to a point inside the cylinder I, and a flexible conduit 15 is connected to this passage by means of a fitting 16, with a valve 17 located between the conduit and the passage. The free end of the conduit provides a fitting 18 by means of which it can be connected to the fuel intake of the carburetor of the same fuel system of which the pump P forms a part. Such a carburetor is shown in dotted lines in Fig. 1 with the reference character C applied thereto, and since this carburetor is of standard construction, a detailed description thereof is unnecessary for the purpose of the present application.

The upper plate 2 also provides a vent passage 19 into which is screwed a valve 20, so that by opening the valve 20, the inside of the cylinder I can be connected to the outside atmosphere. A flexible conduit 21 extends from the valve 20 to a pressure creating device, such as a bulb 22, which upon being squeezed, will force air into the cylinder I, provided the vent valve 20 is open. The bulb 22 provides a small needle valve 23, which when closed will permit air to be forced into the cylinder I by squeezing the bulb 22. The valve 23 provides a vent opening 24, which when the valve 23 is open, will permit the escape of air from the cylinder I, provided the valve 20 is also open, so that the bulb 22 provides means whereby any air pressure built up within the cylinder I can be quickly released.

The upper plate 2 provides a second opening 25 into which is screwed the fitting 26 of a pressure gauge 27 of any conventional type. Therefore, the pointer 28 of the gauge 27 will indicate at all times, the degree of pressure within the cylinder 1, as developed by the delivery of fuel thereto by the pump P, or as built up within the cylinder by squeezing the bulb 22, with the valve 20 open, and the valve 23 closed.

As previously pointed out, the metering rod 6 provides means within the cylinder 1 for indicating the amount of fuel within the cylinder, and for this purpose, the rod 6 provides a series of indicating marks 29, 30 and 31 spaced at predetermined intervals along the length of the rod. These marks are arranged in pairs, with the spaces between the marks representing a definite volume of fuel contained within the cylinder between any particular pair of marks.

For example, the amount of fuel contained within the cylinder between the marks 29, represents one quart of fuel, or ¼ gallon, while the amount of fuel between the marks 30, represents exactly one-half of the fuel between the marks 29, i. e., ⅛ gallon. The middle marks 31 are so spaced that the amount of fuel contained between these marks represents 1/10 gallon. Each testing unit, with its metering rod 6, is independently calibrated with sealed standards to insure accuracy.

The metering rod 6 and its marks 29, 30 and 31, are clearly visible from outside the cylinder 1, through the transparent wall thereof, and obviously, the level of any fuel within the cylinder will also be visible with reference to the marks, particularly when a fuel such as colored gasoline is used. However, to facilitate accurate observation of the metering rod 6, and an exact determination of the fuel level within the cylinder, a float 32 is provided within the cylinder, which will ride on the surface of the fuel. This float is in the form of a disc, composed of cork or other similar material, with the float providing a central sleeve 33 which loosely fits the metering rod 6, and is therefore adapted to ride freely up and down on the rod, as the level of the fuel in the cylinder 1 varies during the use of the device in determining the fuel consumption of an internal combustion engine, in a manner which will next be described. Due to the location of the rod 6 at the exact center of the cylinder 1, the actual level of the fuel can always be read accurately at any angle of the vehicle.

As previously pointed out, the complete apparatus exists as a unit which may be conveniently hung from the partially open window of a vehicle door, such as the door adjacent to the driver's seat. After the handle H has been hung on the window, the unit can be held firmly in position by closing the window as far as the handle will allow, whereupon the cylinder 1 will be substantially at the level of the eyes of the driver, or the accompanying mechanic.

The flexible conduits 10 and 15 are then passed through the small opening at the top of the window, after which the conduit 10 is connected to the discharge side of the fuel pump P by the fitting 13. The outlet conduit 15 is then connected to the inlet side of the carburetor C by the fitting 18, whereupon, the apparatus is ready for use in measuring and testing the fuel consumption of the engine. In other words, the only preliminary operation necessary for setting up the apparatus consists in removing the usual fuel line between the pump and the carburetor, and the screwing of fittings 13 and 18, respectively, into the existing openings provided by the pump and carburetor for connection of the fuel line.

The apparatus having been mounted and connected, as described above, the next step is to open both the inlet valve 12 and the outlet valve 17, with the vent valve 20 remaining closed, followed by the running of the engine, which will serve to pass fuel continuously through the cylinder, without any substantial amount of fuel collecting therein. At this time, the pressure gauge 27 will record the fuel pump pressure, since the gauge is directly connected to the interior of the cylinder 1.

Should the fuel level within the cylinder 1 fail to rise to the point where it can be readily observed by viewing the location of the float 32 with reference to the rod 6, then the vent valve 20 is opened to permit the escape of air from the cylinder through the small vent 24 in the valve 23 of the bulb 22. When the cylinder is partially filled, at least to the level of the lowermost mark 29, the vent valve 20 is again closed, so as to obtain a second reading of the gauge 27, which is then recorded, as representing the pressure developed within the fuel feeding system due to normal operation of the pump P.

The vehicle is then driven to where it is desired to make a road test as to fuel consumption, with a record of the speedometer reading being made where the vehicle is stopped, in preparation for the beginning of a test run. With the engine still running, the vent valve 20 is again opened, which will allow fuel to enter the cylinder until the position of the float 32 indicates that the cylinder 1 has been filled to the point where the consumption of a predetermined amount of fuel can be measured and observed.

For example, should it be so desired to determine the mileage obtained by running the vehicle on the road while consuming ⅛ gallon of fuel, the inlet valve 12 is left open until the float reaches the upper one of the pair of intermediate marks 30 on the rod 6, as indicated by the upper dot and dash line in Fig. 2. As soon as the fuel reaches this mark, the valve 12 is closed, the gauge 27 is observed, and if the reading of its pointer does not correspond to the previous reading of the gauge during normal operation of the motor, the bulb is squeezed one or more times to build up the pressure to the desired reading, with the bulb valve 23 then being closed.

The vehicle is then driven over the selected road course with the inlet valve 2 closed, so that the consumption of fuel can be readily observed by watching the float 32, with reference to the marks on the metering rod 6. Since the road test was started with the float at the upper mark 30, the vehicle will continue to be driven until enough fuel has been consumed by passage through the open valve 17 to the carburetor until the float 32 reaches the lower one of the pair of marks 30, as indicated by the lower dot and dash line in Fig. 2. At the end of any test, it is not necessary to stop the vehicle, or to shut off the engine, it being possible to observe the speedometer reading at any time the float 32 reaches the lower one at any selected pair of marks 30. Thus, the difference between the recorded speedometer readings, will represent the distance traveled while the engine has been consuming exactly ⅛ gallon of fuel. Assuming that the vehicle has traveled a distance of two miles, for example, while consuming ⅛ gallon of fuel, then the test has demonstrated that the motor is getting sixteen miles per gallon of fuel.

Should it be desired to repeat the test to check on fuel consumption for a greater distance, then the inlet valve 12 is left open, in advance of the test, until the float 32 has reached the upper one of the pair of marks 29. The vehicle is then run over the road course again until the float 32 has reached the lower mark 29, which will indicate that the engine has consumed ¼ gallon. In this second test, the distance traveled is multiplied by four to obtain a figure for the miles covered per gallon of fuel.

If, at any time during the progress of a road test under the conditions described above, the reading of the pressure gauge 27 should fall below the previously determined and recorded pressure of the fuel pump P, then the bulb 22 is squeezed one or more times until the desired pressure has been obtained. This pressure control can be carried out very conveniently by the driver, or an assistant observer, so as to insure that the entire test will be made under substantially constant conditions, as regards fuel pressure, so as to simulate as closely as possible, actual conditions of road travel. Since the fuel lines remain full, and the carburetor float remains at its normal level before and after any test, a high degree of accuracy is obtained.

From the foregoing, it is apparent that by the present invention, there is provided an improved apparatus for observing and accurately determining the fuel consumption of the internal combustion engine of a motor vehicle. While the tests described above have been on the basis of certain fractions of a gallon, obviously, the apparatus could readily be constructed to test the consumption of a full gallon by increasing either the diameter or length of the cylinder 1. It is possible to very accurately determine the capacity of the cylinder 1 at the time of building the apparatus, and to very accurately calibrate the metering rod 6 so that the spacing between any given pair of marks thereon will represent a known quantity of fuel measured in the terms of some commonly accepted unit of fluid measure.

I claim:

An apparatus for testing the fuel consumption of an automobile internal combustion engine having a fuel pump and a carburetor comprising a closed fuel reservoir having a transparent wall, an indicator within the reservoir having upper and lower level marks visible through the wall which indicate a predetermined volume of fuel within the reservoir between the levels of said marks, a pipe line having means for removably connecting the reservoir with the fuel pump and a pipe line having means for removably connecting the reservoir with the carburetor so that fuel may be forced normally by the pump through the reservoir and to the carburetor, a valve in each pipe line for controlling the fuel flow and providing for the reservoir being filled by the fuel pump to the upper level mark, a pressure gauge connected to the reservoir for indicating the air pressure within the reservoir continuously during a test and so as to duplicate the pressure caused by a normal non-testing fuel pump operation, and a manually controlled air pump having a controllable valve serving as an air outlet and inlet and a pipe connection with the reservoir which serve for the egress of air during a filling operation while the fuel pipe line valve is open and the carburetor pipe line valve is closed and for introducing air under pressure to the reservoir during a test operation while the fuel pump pipe line valve is closed and the carburetor pipe line valve is open, so that fuel may be fed to the carburetor by a maintained air pressure under a simulated normal fuel pump action while the automobile is driven through a measurable distance to lower the fuel level from said upper to the lower level indicator mark.

DANTE BRACCI.

References Cited in the file of this patent

UNITED STATES PATENTS

| Number | Name | Date |
|---|---|---|
| 1,853,970 | Gauthier | Apr. 12, 1932 |
| 2,073,243 | Liddell et al. | Mar. 9, 1937 |
| 2,102,615 | Cubete | Dec. 21, 1937 |
| 2,276,901 | Watson | Mar. 17, 1942 |
| 2,309,386 | Gauthier | Jan. 26, 1943 |